United States Patent
Sampath et al.

(10) Patent No.: US 8,737,373 B2
(45) Date of Patent: May 27, 2014

(54) SIGNALING SEPARATE UNICAST AND BROADCAST INFORMATION WITH A COMMON PILOT

(75) Inventors: Ashwin Sampath, Princeton, NJ (US);
Gavin Horn, La Jolla, CA (US);
Husheng Li, Knoxville, TN (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 12/437,036

(22) Filed: May 7, 2009

(65) Prior Publication Data
US 2009/0279563 A1   Nov. 12, 2009

Related U.S. Application Data

(60) Provisional application No. 61/052,066, filed on May 9, 2008.

(51) Int. Cl.
*H04H 20/67*        (2008.01)
*H04J 11/00*        (2006.01)

(52) U.S. Cl.
USPC ............ 370/339; 370/206; 370/328; 455/522

(58) Field of Classification Search
USPC .......... 370/206, 328–339, 532–534; 375/295; 455/522
See application file for complete search history.

(56) References Cited

U.S. PATENT DOCUMENTS

| | | | |
|---|---|---|---|
| 5,881,368 A * | 3/1999 | Grob et al. ....................... 455/69 |
| 6,115,390 A * | 9/2000 | Chuah ........................... 370/443 |
| 6,377,548 B1 * | 4/2002 | Chuah ........................... 370/233 |
| 7,522,552 B2 * | 4/2009 | Fein et al. ...................... 370/328 |
| 7,809,394 B1 * | 10/2010 | Li et al. .......................... 455/522 |
| 7,876,699 B2 * | 1/2011 | Tang .............................. 370/252 |
| 2006/0098567 A1 * | 5/2006 | Willenegger et al. ......... 370/206 |
| 2006/0229083 A1 * | 10/2006 | Redi .............................. 455/453 |
| 2006/0285483 A1 * | 12/2006 | Khan ............................. 370/208 |
| 2007/0002724 A1 * | 1/2007 | Khan ............................. 370/203 |
| 2007/0054625 A1 * | 3/2007 | Beale .............................. 455/69 |
| 2007/0097853 A1 * | 5/2007 | Khandekar et al. ........... 370/208 |
| 2007/0104151 A1 * | 5/2007 | Papasakellariou et al. ... 370/335 |
| 2007/0202913 A1 * | 8/2007 | Ban ............................... 455/522 |
| 2008/0032744 A1 * | 2/2008 | Khan et al. ................ 455/562.1 |
| 2008/0084845 A1 * | 4/2008 | Kuchibhotla et al. ......... 370/331 |

(Continued)

FOREIGN PATENT DOCUMENTS

| | | |
|---|---|---|
| EP | 2299740 A1 * | 3/2011 |
| JP | 2009505597 A | 2/2009 |

OTHER PUBLICATIONS

International Search Report/Written Opinion—PCT/US09/043250—International Search Authority EPO—Oct. 8, 2009.
Taiwan Search Report—TW098115372—TIPO—May 22, 2012.

*Primary Examiner* — Benjamin H Elliott, IV
(74) *Attorney, Agent, or Firm* — James K. O'Hare

(57) ABSTRACT

Aspects describe conveying unicast information and broadcast information in a resource set for a transmission request. The unicast information and broadcast information can be transmitted at substantially the same time. Power control can be applied separately to the unicast information and the broadcast information for reliable decoding. A null request can be indicated by "00" bits in a unicast portion and a zero power level in the broadcast portion.

29 Claims, 10 Drawing Sheets

(56) References Cited

U.S. PATENT DOCUMENTS

| | | | |
|---|---|---|---|
| 2008/0101271 A1* | 5/2008 | Kwon et al. | 370/312 |
| 2008/0144612 A1* | 6/2008 | Honkasalo et al. | 370/370 |
| 2008/0175264 A1* | 7/2008 | Qu et al. | 370/436 |
| 2008/0181156 A1* | 7/2008 | Ecclesine | 370/311 |
| 2008/0219228 A1* | 9/2008 | Seok et al. | 370/338 |
| 2009/0046617 A1* | 2/2009 | Tenny et al. | 370/312 |
| 2009/0196165 A1* | 8/2009 | Morimoto et al. | 370/208 |
| 2009/0279563 A1* | 11/2009 | Sampath et al. | 370/432 |

\* cited by examiner

US 8,737,373 B2

SIGNALING SEPARATE UNICAST AND BROADCAST INFORMATION WITH A COMMON PILOT

CROSS-REFERENCE

This application claims the benefit of U.S. Provisional Application Ser. No. 61/052,066, filed May 9, 2008, entitled "SIGNALING SEPARATE UNICAST AND BROADCAST INFORMATION WITH A COMMON PILOT," and assigned to the assignee hereof and the entirety of which is incorporated herein by reference.

BACKGROUND

I. Field

The following description relates generally to wireless communication systems and more particularly to conveying unicast and broadcast information at substantially the same time.

II. Background

Wireless communication systems are widely deployed to provide various types of communication. For example, voice, data, video, and so forth can be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking, and so forth). Generally, wireless communication networks are established through a mobile device communicating with a base station or access point. The access point covers a geographic range or cell and, as the mobile device is operated, the mobile device can be moved in and out of these geographic cells.

A network can also be constructed utilizing solely peer-to-peer devices without utilizing access points or the network can include both access points (infrastructure mode) and peer-to-peer devices. These types of networks are sometimes referred to as ad hoc networks or peer-to-peer networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

Typically, in peer-to-peer networks, a transmitting node (e.g., mobile device, access point) transmits some information to its target receiver (unicast) and some information to other receivers (broadcast). The unicast information may include information such as extent of buffer build-up, Quality of Service (QoS) being requested, and so forth. The broadcast information can convey access priority (or equivalent metric such as marginal utility), an indication of the power level at which the node would interfere, and so on. Furthermore, a pilot may be sent for coherent demodulation. The setup includes common shared resources (symbols and tones) that nodes use for the signaling. Pure energy based signaling and corresponding non-coherent detection can result in false alarms at the intended receiver when there are collisions in resource selection between competing links and/or improper setting of power on the requests since it can be used for multiple purposes (e.g., to close the link to the target receiver and also to convey extent of interference to other receivers in the vicinity). Thus, there exists a need to overcome the aforementioned as well as other problems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with conveying unicast and broadcast information in a resource set for a transmission request. Power control can be applied in the unicast portion for more reliable decoding of unicast information at the target receiver. Null bits in the unicast portion and the power level in the broadcast portion are combined to detect the existence (or lack thereof) of a request.

An aspect relates to a method performed by a transmitter device for multiplexing unicast and broadcast information in a communication system. The method includes encoding unicast information in one or more resources and encoding broadcast information in a subset of the one or more resources if the broadcast information is being sent with the unicast information. Method also includes transmitting unicast information and broadcast information to one or more receiving devices as a request to transmit.

Another aspect relates to a wireless communications apparatus that includes a memory and a processor. The memory retains instructions related to encoding unicast information in a first resource and encoding broadcast information in a second resource if the broadcast information is being sent with the unicast information. In accordance with some aspects, the second resource is a subset of the first resource. However, in accordance with other aspects, the second resource is not a subset of the first resource. The memory also retains instructions related to transmitting the first resource and the second resource to one or more receiving devices as a request to transmit. The processor is coupled to the memory and is configured to execute the instructions retained in the memory.

Yet another aspect relates to an apparatus that includes means for encoding unicast information in one or more resources and means for encoding broadcast information in one or more resources if the broadcast information is being sent with the unicast information. Apparatus also includes means for selectively controlling power for the unicast information and the broadcast information. Further, apparatus includes means for transmitting unicast information and broadcast information to one or more receiving devices as a request to transmit.

Still another aspect relates to a computer program product comprising a computer-readable medium that comprises a first set of codes for causing a computer to encode unicast information in one or more resources. The computer-readable medium also includes a second set of codes for causing the computer to encode broadcast information in the one or more resources if the broadcast information is sent with the unicast information. The unicast information is encoded as a function of whether the broadcast information is being sent with the unicast information. The computer-readable medium further includes a third set of codes for causing the computer to transmit a request to transmit that includes the unicast information and the broadcast information to one or more receiving devices.

A further aspect relates to at least one processor configured to multiplex unicast and broadcast information in a communication system. The processor includes a first module for encoding unicast information in one or more resources and a second module for encoding broadcast information in a subset of the resources if the broadcast information is being sent with the unicast information. The unicast information is encoded as a function of whether broadcast information is being sent at substantially the same time as the unicast information. The processor also includes a third module for transmitting the unicast information and the broadcast information to one or more receiving devices as a request.

Another aspect relates to a method performed by a receiver device for receiving multiplexed unicast and broadcast information in a communication system. The method includes receiving a signal that includes a unicast portion and a broadcast portion. The method also includes determining if the signal includes power in a unicast portion only or power in both the unicast portion and a broadcast portion and selectively decoding the signal based on the power determination. In accordance with some aspects, a power level of the broadcast information and decoded bits of the unicast portion can be combined to detect a transmission request.

Yet another aspect relates to a wireless communications apparatus comprising a memory and a processor. The memory retains instructions related to receiving a signal and determining if the signal includes power in a unicast portion or in both the unicast portion and a broadcast portion. The memory also retains instructions related to selectively decoding the signal based on the power determination. The processor is coupled to the memory and configured to execute the instructions retained in the memory.

Still another aspect relates to an apparatus that includes means for receiving a signal and means for determining if the signal includes power in a unicast portion or in both the unicast portion and a broadcast portion. The apparatus also includes means for selectively decoding the signal based on the power determination.

A further aspect relates to a computer program product comprising a computer-readable medium. The computer-readable medium includes a first set of codes for causing a computer to receive a signal and a second set of codes for causing the computer to determine if the signal includes power in a unicast portion or in both the unicast portion and a broadcast portion. The computer-readable medium also includes a third set of codes for causing the computer to selectively decode the signal based on the power determination.

Still another aspect relates to at least one processor configured to receive multiplexed unicast and broadcast information in a communication system. The at least one processor includes a first module for receiving a signal and a second module for determining if the signal includes power in a unicast portion or in both the unicast portion and a broadcast portion. The at least one processor also includes a third module for selectively decoding the signal based on the power determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
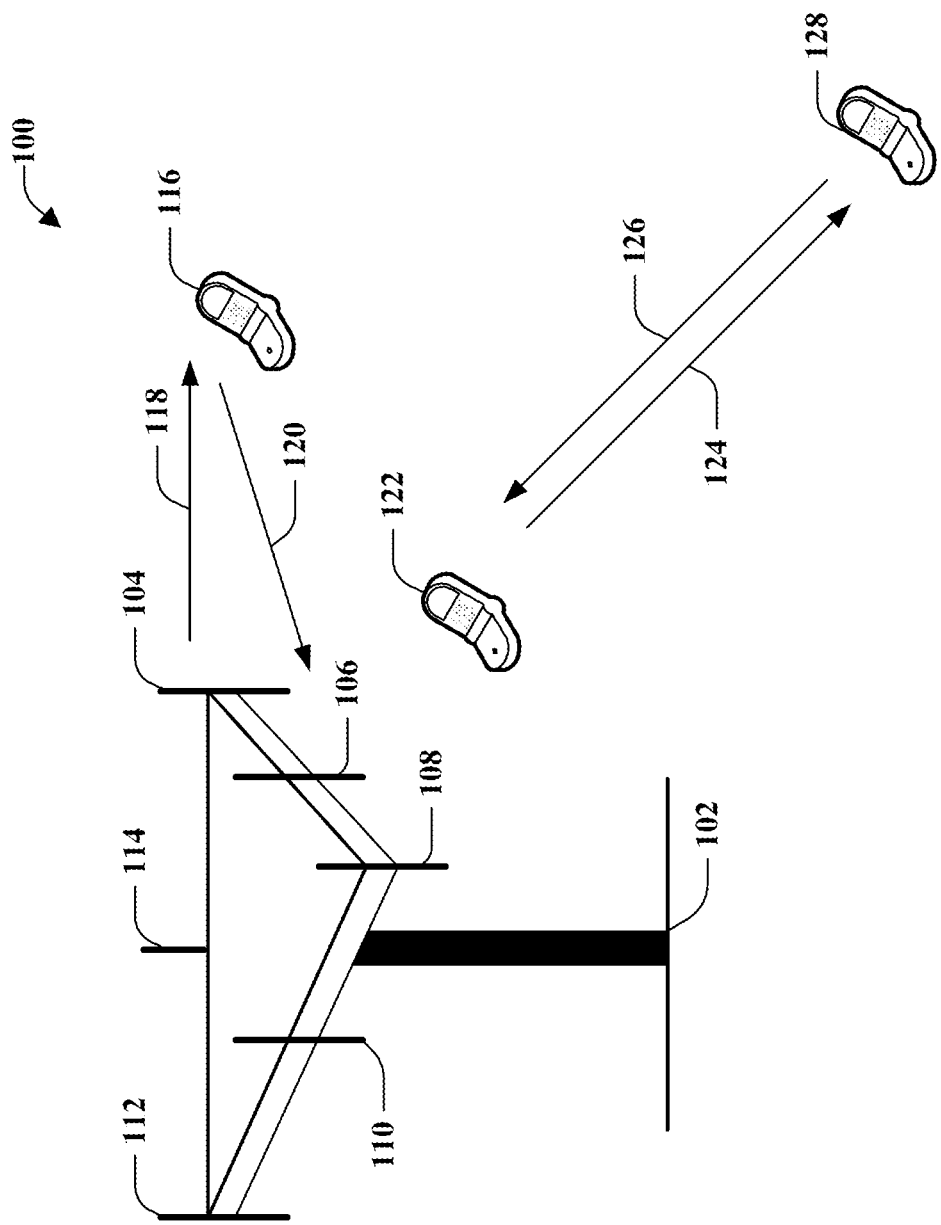
FIG. 1 illustrates a wireless communication system in accordance with various embodiments presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Additionally, the base station 102 can be a home base station, a Femto base station, and/or the like.

Base station 102 can communicate with one or more mobile devices such as mobile device 116; however, it is to be appreciated that base station 102 can communicate with substantially any number of mobile devices similar to mobile device 116. As depicted, mobile device 116 is in communication with antennas 104 and 106, where antennas 104 and 106 transmit information to mobile device 116 over a forward link 118 and receive information from mobile device 116 over a reverse link 120.

In addition, mobile devices 122 and 128 can be communicating with one another, such as in a peer-to-peer configuration. Moreover, mobile device 122 is in communication with mobile device 128 using similar links 124 and 126. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In a peer-to-peer ad hoc network, devices within range of each other, such as devices 122 and 128, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of mobile devices or nodes that are in wireless communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information). Any node within network can convey information and each node can include a memory and a processor, coupled to the memory, configured to execute the instructions retained in the memory.

In accordance with some aspects, unicast information and broadcast information can be conveyed in a resource set for a transmission request. A unicast waveform includes a packet destined for a single user or mobile device 102. A multicast waveform includes a packet destined for multiple users, such as all mobile devices within a communications network.

Figure 2:
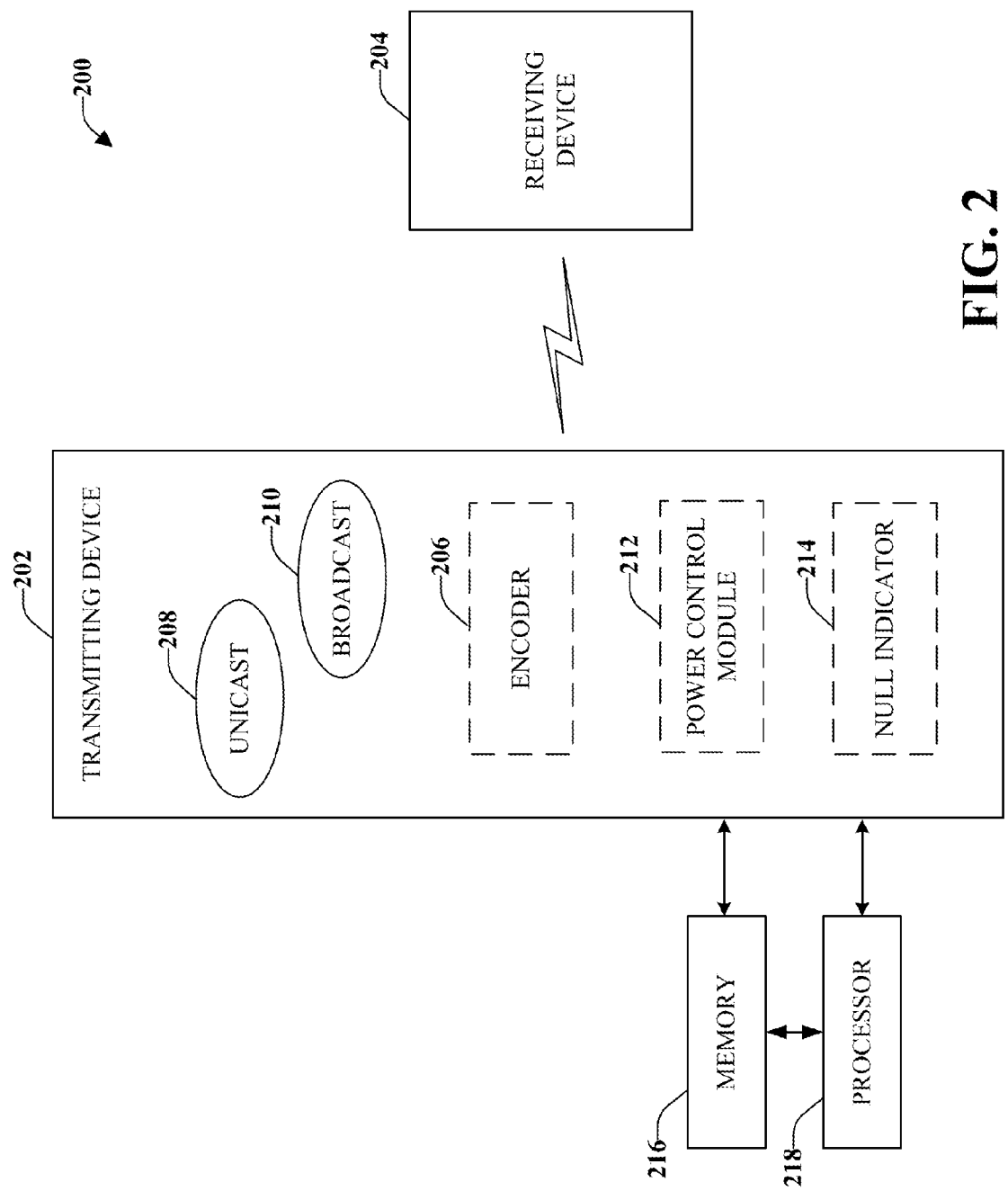
FIG. 2 illustrates a system for transmitting unicast and broadcast information at substantially the same time within a communications environment, according to an aspect.

FIG. 2 illustrates a system 200 for transmitting unicast and broadcast information at substantially the same time within a communications environment. The unicast information is for an intended receiver and the broadcast information is provided for interferers in the communications environment. System 200 can multiplex the unicast and broadcast information, which can mitigate false alarms while providing power control on the unicast and broadcast portions separately.

System 200 includes a transmitting device 202 that transmits unicast information and/or broadcast information to a receiving device 204. Although a number of transmitting devices 202 and receiving devices 204 can be included in a system 200, only one of each is illustrated for purposes of simplicity.

Included in transmitting device 202 is an encoder 206 that is configured to modulate and/or encode signals that can be transmitted to receiving device 204 in accordance with a suitable wireless communication protocol. In accordance with some aspects, encoder 206 can be a voice coder (vocoder) that utilizes a speech analyzer to convert analog waveforms into digital signals or encoder 206 can be another type of encoder. Encoder 206 can further be configured to encode unicast information 208 separately from broadcast information 210.

The unicast information can include various types of information such as a priority level, a buffer size, and so on, to indicate a Request to transmit. Broadcast information can include the amount of interference (implicitly through a power level of transmission or explicitly using bits to indicate a power level), a priority level (which might be a priority level different than the priority level included in the unicast information or it might be the same priority level), or other types of information. In accordance with some aspects, the unicast information is encoded as a function of whether broadcast information is being sent at substantially the same time as the unicast information. According to some aspects, a pilot can be transmitted on the broadcast portion and the unicast portion can utilize the same pilot for coherent demodulation at the receiver, thus, a pilot might not be sent on the unicast portion. This assumes that the pilot power setting based on the broadcast portion is sufficiently strong for coherent demodulation (which should usually be the case).

The unicast information and/or the broadcast information can be included in one or more resources. The number of resources utilized for either or both the unicast information and the broadcast information can be the same number of resources or a different number of resources. In accordance with some aspects, there is no one-to-one relationship in terms of the number of resources utilized for the unicast information and/or the broadcast information. For example, in accordance with an aspect, the unicast portion could be mapped on to all the resources set aside for transmission of unicast and broadcast information by the user, while the broadcast information could be on a subset of those resources.

A power control module 212 is configured to perform power control to improve reliability of decoding the information and also to mitigate causing interference on the shared resources. The power for the broadcast portion 210 can be maintained at a constant level or scaled in proportion to the desired power for data transmission to which this control information corresponds, which can be utilized to determine the interference to other nodes. The unicast information should be sent at a power level so that the intended receiver can detect the signal. The broadcast information should be sent at a power so that a multitude of receiving devices in the vicinity that are likely to be interfered with can detect the signal and determine the extent of interference that the receiving devices could experience. Thus, in accordance with some aspects, the unicast information can be sent at a power level that is lower or higher than the power level utilized to transmit the broadcast information.

In accordance with some aspects, power may be sent by power control module 212 in the unicast portion at all times and power may be sent in the broadcast portion only when a request is sent. A benefit of such an approach is that it mitigates the false alarm probability at the target resource about the presence of a request while still correctly indicating the power transmission (including zero power when no request is being made) for the broadcast portion to the unintended receivers.

Figure 3:
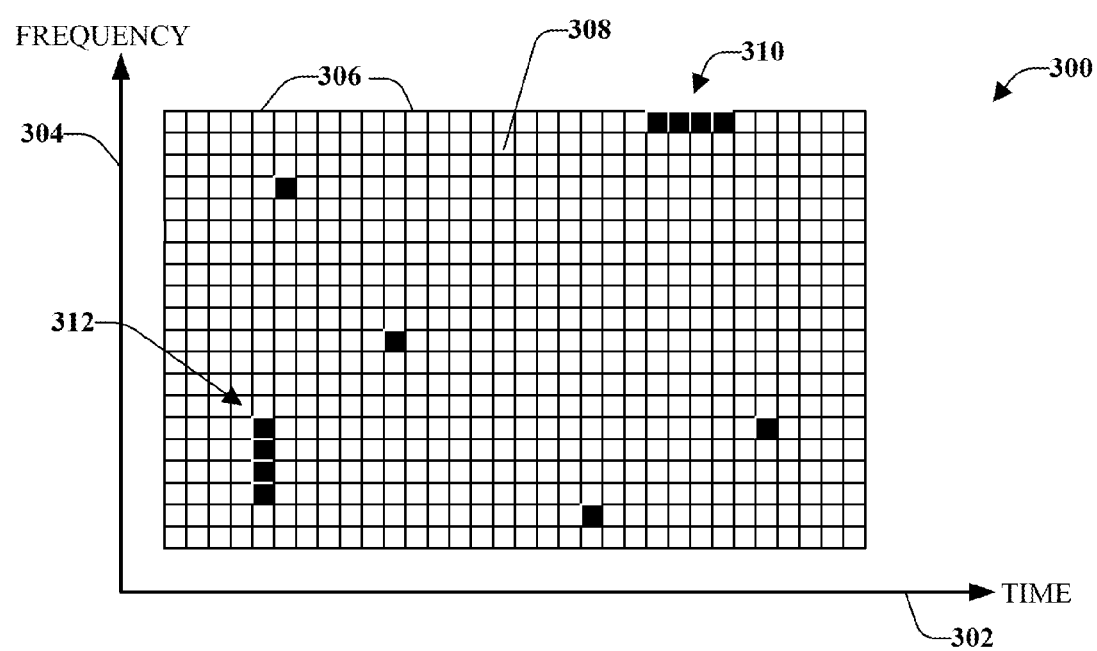
FIG. 3 illustrates a time-frequency grid of shared resources with an example of the transmitted signal in the grid, according to an aspect.

To fully appreciate the disclosed aspects, FIG. 3 illustrates a time-frequency grid of shared resources with an example of the transmitted signal 300 in a grid, in accordance with one or more of the aspects described herein. It should be understood that although the various aspects disclosed herein may be discussed with reference to an Orthogonal Frequency Division Multiplexing (OFDM), other signaling techniques can be utilized with the described aspects. The horizontal axis 302 represents time and the vertical axis 304 represents frequency. A vertical column, of which a few are labeled at 306, represents the tones in a given symbol period. Each small box, such as box 308, represents a tone-symbol, which is a single tone over a single transmission symbol period. A degree of freedom in an OFDM symbol is a tone-symbol 308.

Resource sets can include four resources or two resources, according to various aspects. Examples of three different four resource sets are illustrated by the black boxes. At 310 is a representation of a horizontal resource set and at 312 is a representation of a vertical resource set. Further, a resource set can be scattered throughout the time-frequency grid, as illustrated by the scattered black boxes.

Figure 4:
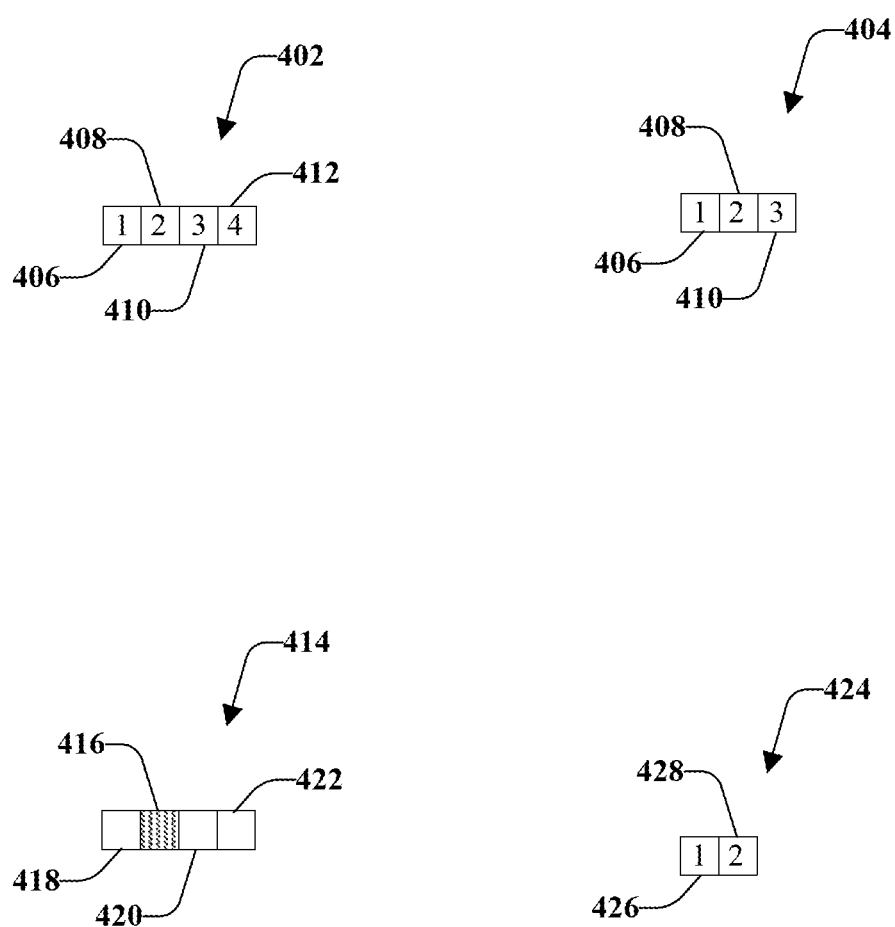
FIG. 4 illustrates examples of resource sets that can be utilized with the disclosed aspects.

With reference also to FIG. 4, illustrated are examples of resource sets that can be utilized with the disclosed aspects. In accordance with some aspects, the resource sets illustrated (e.g., four resources) can be contiguous resources selected from a shared time-frequency grid. However, the disclosed aspects are not limited to contiguous resources.

Illustrated, at 402, is an example design of a four-bit resource set that includes a parity check bit, according to an aspect. This example resource set 402 includes two bits of unicast information only. Two additional bits are mainly for broadcast information, but can be utilized for unicast information also. For example, the two unicast only bits could be buffer level indication and two additional bits could be indicating a priority level. Priority level bits could be utilized by a desired receiver to determine how to schedule among a set of competing transmitter nodes to itself. An undesired receiver can utilize the priority level bits to determine whether to back off or whether to not back off (from receiving from its intended transmitters in turn).

Illustrated, at 404, is an example design of a similar resource set without a parity check bit. It should be understood that this figure illustrates an example embodiment and the number of bits can be more or less than those shown and described and those skilled in the art can readily amend the example designs presented herein. In these example resource sets 402 and 404, resource 406 includes pilot bits for coherent demodulation and interference level indication. Resource 408 includes buffer level bits and is for unicast only. Resource 410 includes priority metric bits that are mainly for broadcast, but can also be utilized for unicast. An intended receiver can also use this resource 410 in some cases. Resource 412 includes parity check bits and is for optional use (e.g., can be used to improve reliability).

A power level of resource 406 can be based on the desired data transmission power. This allows unintended receivers to account for interference. It can be assumed that the power level of resource 406 will be sufficient for channel estimation at a target receiver to decode other bits. A power level of resource 410 and optional resource 412 are power controlled based on reaching unintended receivers to which the transmitting node is a dominant interferer. In accordance with some aspects, resource 412 may alternatively be power controlled just to the desired resource. Further, a power level of resource 408 is power controlled to a target receiver to close the link.

Illustrated at 414 is a null request. Bits "00" indicating a null request are sent in resource 416. All other resources 418, 420, and 422 are left with zero power. The desired receiver can use a combination of energy detection, absence on resources 418, 420, and 422, and presence of energy in resource 416 to detect energy. Absence of energy on resource 418 can allow the undesired receivers to determine that no interference from this transmitter is imminent. In accordance with some aspects, if the signal-to-noise ratio of the desired link is low, the null request transmission can be boosted in power to improve reliability of energy detection.

Illustrated at 424 is an example design of two-bits of unicast information only. One additional bit can be utilized for both unicast and broadcast. For example, the two unicast only bits could be buffer level indication and one additional bit could be indicating the priority level. A priority level bit (indicating urgent/non-urgent) can be utilized by a desired receiver to determine how to schedule among a set of competing transmitter nodes to itself. Undesired receivers can utilize the priority level bit to determine whether to back off or whether to not back off (from receiving from its intended transmitters in turn).

In this example, resource 426 is a Quadrature Phase-Shift Keying (QPSK) signal containing pilot bit and priority bit. Pilot bit can be either on the "in-phase" branch or "quadrature" branch. Correspondingly, the priority bit would be on the branch on which pilot is absent. It should be noted that to demodulate the bits in resource 428, the priority bit is signaled using on/off keying. Thus, zero energy is placed for one binary value and non-zero energy is placed for the other binary value. Resource 428 includes two-bits indicating buffer level to the desired receiver.

When a null request is sent, no energy is placed on resource 426. In the example two-bit design 424, where a pilot bit is used only in either the in-phase or quadrature branch, detection of the bits can be performed according to the following. First, two channel estimates are created based on resource 426. One estimate with the priority bit equal to zero and the other estimate with priority bit equal to one. The complex conjugate of each of the two channel estimates are multiplied with the received complex value on resource 428 to form two alternative decision statistics. Since resource 428 utilizes QPSK modulation with constellation points on the 45-degree and 135-degree lines, the decision statistic (from the two decision statistics) that is closest in angle to one of those lines is determined. Next, the closest constellation point is found. The two bits corresponding to that constellation point are read out. This takes care of the two bits on resource 428. Depending on which of the two hypotheses from above was used for bits on resource 428, the bit on resource 426 is read out.

With reference again to FIG. 2, transmitting device 202 can include a null indicator 214 that can be configured to send a "00" in the unicast portion (or any agreed upon sequence or indicator of the absence of a request) when there is no request. The "00" indicates a null request and no power (or very little power) is transmitted in the broadcast portion when a null request is transmitted. A receiving device can detect a request by combining the power level on the broadcast information and the decoded bits in the unicast portion, which can be utilized to mitigate the probability of false alarms (e.g., detecting that a request is present where there is not a request). The null request may be used when the transmitter has determined that it cannot transmit any data in the data portion as it has been blocked by a receiver that it cause a lot of interference to. The null request is utilized to indicate to the receiver that the transmitter has data to send but is prevented from sending by a receiver in the vicinity. Thus, the null request lets the receiver know that the receiver needs to compete for the medium to create an opportunity for its transmitter to transmit.

For example, transmitting device 202 is not able to convey information because its priority level is too low. However, there is a need to inform receiving device 204 that there is information to send but it cannot be sent because of the low priority level relative to what receivers are advertising in the neighborhood. Alternatively, transmitting device 202 might not have information to send and there is a reason to inform receiving device that there is no information. In either of these situations (or for other reasons), the null request is sent on the unicast portion and no information is sent on the broadcast portion. The null request, since the power is sent in the unicast portion, is only received by the intended receiver. The other devices, with which transmitting device 202 might interfere, do not detect the null request.

System 200 can include memory 216 operatively coupled to transmitting device 202. Memory 216 can be external to transmitting device 202 or can reside within transmitting device 202. Memory 216 can store information related to encoding unicast information in one or more resources and encoding broadcast information in one or more resources if the broadcast information is being sent at substantially the same time as the unicast information. Further memory 216 can store information relating to selectively controlling the power for the unicast information and the broadcast information and transmitting the unicast information and the broadcast information to one or more receiving devices as a request. Memory 216 can also store information related to other suitable information related to signaling separate unicast and broadcast information with a common pilot in a communication network, which can be a peer-to-peer or ad hoc communication network.

A processor 218 can be operatively connected to transmitting device 202 (and/or memory 216) and configured to execute the instructions retained in the memory. Processor 218 can be a processor dedicated to analyzing and/or generating information transmitted by transmitting device 202, a processor that controls one or more components of system 200, and/or a processor that both analyzes and generates information transmitted by transmitting device 202 and controls one or more components of system 200.

Memory 216 can store protocols associated with signaling unicast and broadcast information, taking action to control communication between transmitting device 202 and one or more receiving devices, and so forth, such that system 200 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 220 of the disclosed aspects are intended to comprise, without being limited to, these and other suitable types of memory.

Figure 5:
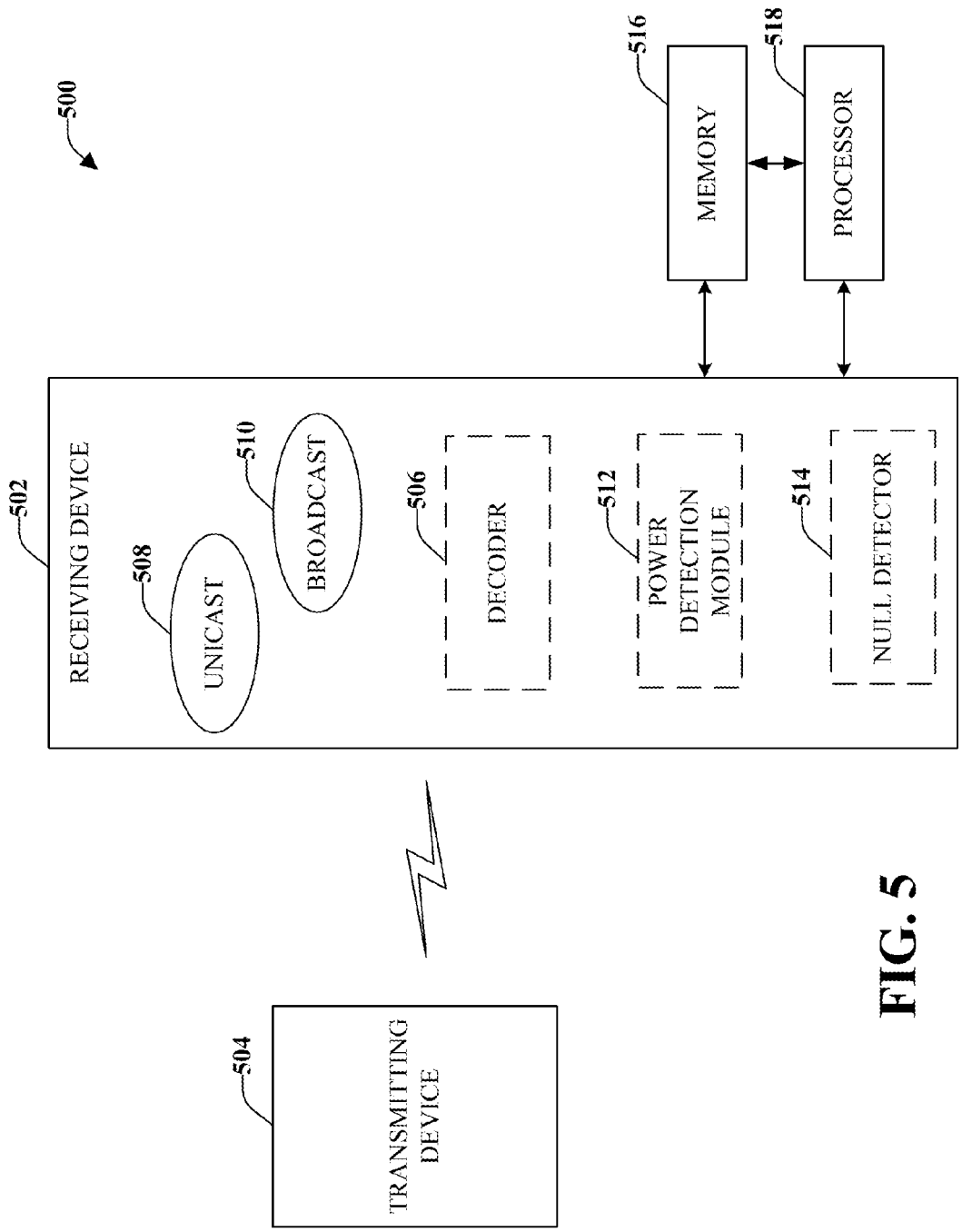
FIG. 5 illustrates a system for receiving unicast and broadcast information within a communications environment, according to an aspect.

FIG. 5 illustrates a system 500 for receiving unicast and broadcast information within a communications environment. System 500 includes a receiving device 502 that receives unicast and/or broadcast information from a transmitting device 504 (e.g., transmitting device 202 of FIG. 2). Although a number of receiving devices and transmitting devices can be included in system 500, only one of each is illustrated for purposes of simplicity.

Receiving device 502 includes a decoder 506 that can decode a received signal and/or data packet therein for processing. Decoder 506 can evaluate the received signal for a unicast portion 508 and/or a broadcast portion 510 and for information contained therein.

Also included in receiving device 502 is a power detection module 512 that is configured to determine if power is received for unicast information 508 and/or for broadcast information 510. Power for the unicast information 508 might be received at most times while power for the broadcast information 510 might only be received when a (non-null) request is received.

Also included in receiving device 502 is a null detector 514, which can be configured to determine whether a "00" is received in the unicast portion 508. The "00" indicates a null request and that there is no power in the broadcast portion. The existence of a request can be detected by combining the power level on the broadcast information 510 and decoded bits in the unicast portion 508. The null request can mitigate the probability of false alarms.

System 500 can include memory 516 operatively coupled to receiving device 502. Memory 516 can be external to receiving device 502 or can reside within receiving device 502. Memory 516 can store information related to receiving a signal, determining if the signal includes power in a unicast portion or in both the unicast portion and a broadcast portion, and selectively decoding the signal based on the power determination. Memory 516 can also retain other suitable information related to signals transmitted and received in a communication network. A processor 518 can be operatively connected to receiving device 502 (and/or memory 516) to facilitate analysis of information related to receiving a common pilot that includes separate unicast and broadcast information in a communication network. Processor 518 can be a processor dedicated to analyzing and/or generating information received by receiving device 402, a processor that controls one or more components of system 500, and/or a processor that both analyzes and generates information received by receiving device 502 and controls one or more components of system 500.

Memory 516 can store protocols associated with decoding unicast and broadcast information, taking action to control communication between receiving device 402 and a transmitting device 504, and so forth, such that system 500 can employ stored protocols and/or algorithms to achieve improved communications in a wireless network as described herein.

In accordance with some aspects, the components associated with transmitting device 202 of FIG. 2 and receiving device 502 of FIG. 5 can be included a single device, although illustrated and described as separate devices. Thus, a single device can include the functionality of both transmitting and receiving information in accordance with the aspects disclosed herein. As such, a single device can transmit and/or receive information in accordance with the various aspects disclosed herein.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
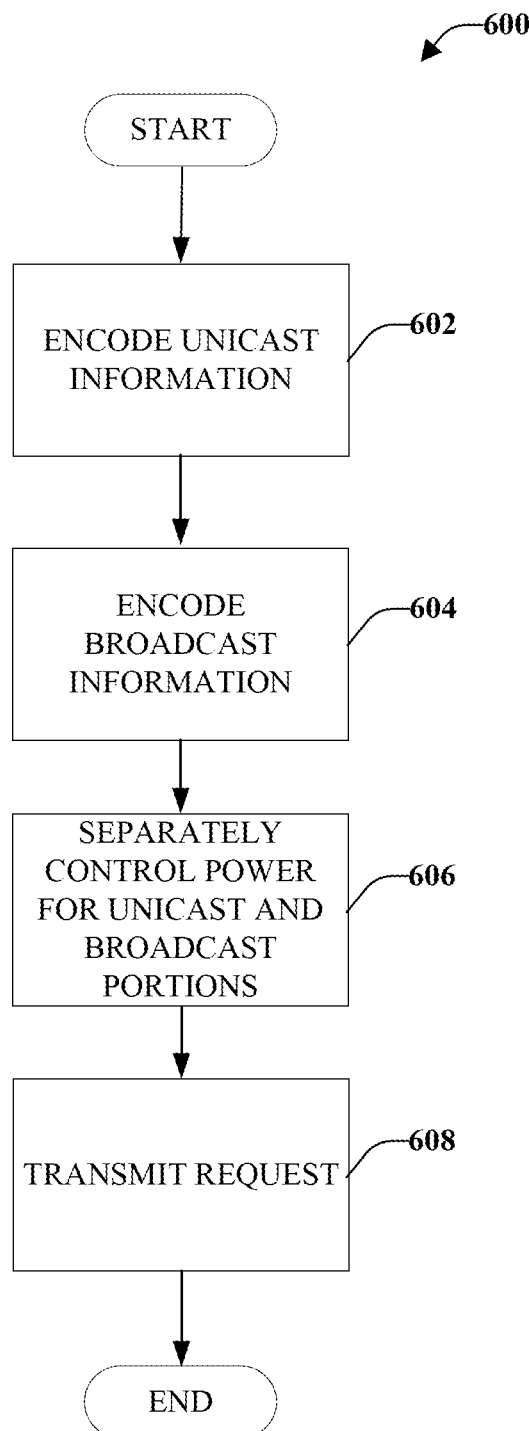
FIG. 6 illustrates a method for multiplexing unicast and broadcast information in a communication system in accordance with an aspect.

FIG. 6 illustrates a method 600 for multiplexing unicast and broadcast information in a communication system. In accordance with some aspects, control resources can be shared. Method 600 can mitigate false alarms and can allow for appropriate power control on the unicast and broadcast portions separately. Power control of the unicast portion can allow better reuse of the unicast control portion, by using just enough power to transfer the information reliably across to the intended receiver. The broadcast portion can convey the power at which interference will be seen.

Method 600 starts, at 602, when unicast information is encoded in one or more resources. At 604, broadcast information is encoded in a subset of the one or more resources if the broadcast information is being sent with the unicast information. The resources for the broadcast information are a subset of the resources of the unicast information. The unicast information is encoded as a function of whether broadcast information is being sent at substantially the same time as the unicast information.

In accordance with some aspects, the one or more resources are contiguous resources selected from a resource set of a shared time-frequency grid. Additionally, the one or more resources can include a first bit for unicast information and at least a second bit for broadcast/unicast information. The bit for unicast information can be a buffer level indication and the bit for broadcast/unicast information indicates a priority level.

At 606, the power for the unicast information and the broadcast information is selectively controlled. In accordance with some aspects, the power for the unicast information and the power for the broadcast information are controlled separately. According to some aspects, selectively controlling the power for the unicast information and the broadcast information includes maintaining power for at least one portion of the broadcast information to assist the one or more (unintended) receiving devices to determine interference. At 608, the unicast information and the broadcast information are transmitted to one or more receiving devices as a transmission request.

In accordance with some aspects, controlling the power for the unicast information and the broadcast information includes selecting the unicast portion power based on closing a link to a target receiver. The broadcast portion power can be selected based on the desired power level for data transmission, so as to indicate the level of interference that the unintended receivers can expect to experience.

In accordance with some aspects, a determination can be made whether the transmission request can be sent. If the transmission request cannot be sent, a null request may be transmitted on the unicast portion and no power is applied on the broadcast information portion. The null request indicates that a transmitter device wants to convey a request to send data but is prevented from conveying the request.

Alternatively or additionally, the one or more resources can include pilot bits, priority metric bits, and optional parity check bits. Method 600 can include providing power on the pilot bits for interference level indication at a target receiver. Method 600 can also include power controlling a power level on the priority metric bits and the optional parity check bits based on reaching unintended receivers, wherein the transmitter device is a dominant interferer.

Figure 7:
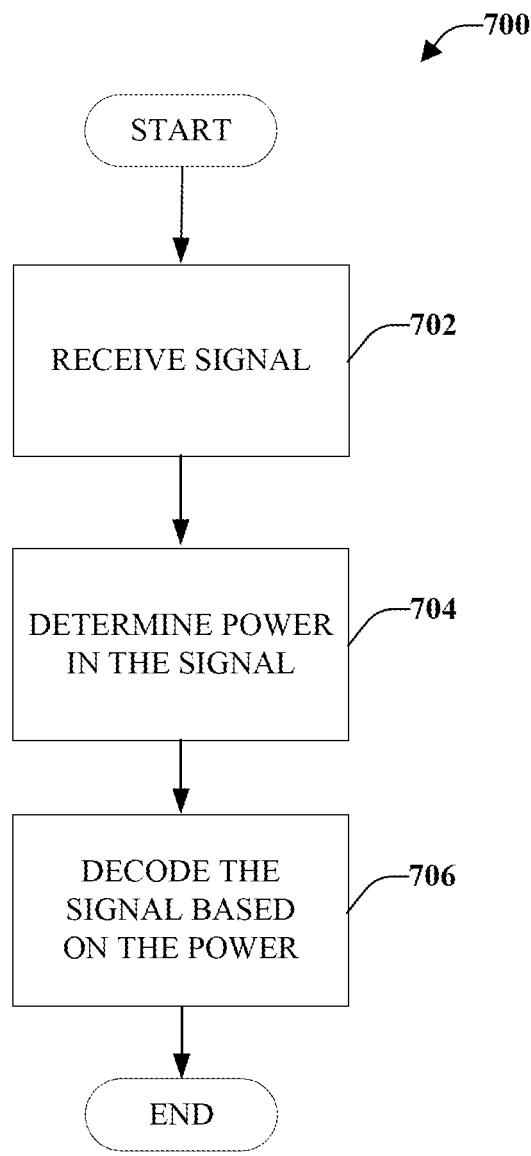
FIG. 7 illustrates a method for receiving multiplexed unicast and broadcast information, according to an aspect.

FIG. 7 illustrates a method 700 for receiving multiplexed unicast and broadcast information. Method 700 starts, at 702, when a signal is received. The received signal can include unicast information or unicast and broadcast information.

At 704, a power level for the unicast information and/or the broadcast information is determined. In accordance with some aspects, a power level of the broadcast information can be combined with decoded bits of the unicast portion to detect a transmission request. In accordance with some aspects, no power in the broadcast portion indicates a null request. The null request indicates that a transmitter device wants to convey a request to send data but is prevented from conveying the request.

The signal is selectively decoded, at 706, based on the power level of the unicast signal and/or the power level of the broadcast signal. Method 700 can also include competing for shared control resources to create an opportunity for the transmitter device to convey the request.

In accordance with some aspects, the receiver is an intended receiver and the unicast portion includes a buffer level indication and the combined broadcast/unicast portion indicates a priority level. Method 700 can include utilizing the priority level bits to schedule among a set of competing transmitter devices.

According to some aspects, the receiver is an unintended receiver. The unicast portion can include a buffer level indication and the combined broadcast/unicast portion indicates a priority level. Method 700 can include utilizing the priority level bits to determine whether to back off. In accordance with some aspects, if the receiver is an unintended receiver, method 700 can include estimating an interference as a function of a pilot power level.

Figure 8:
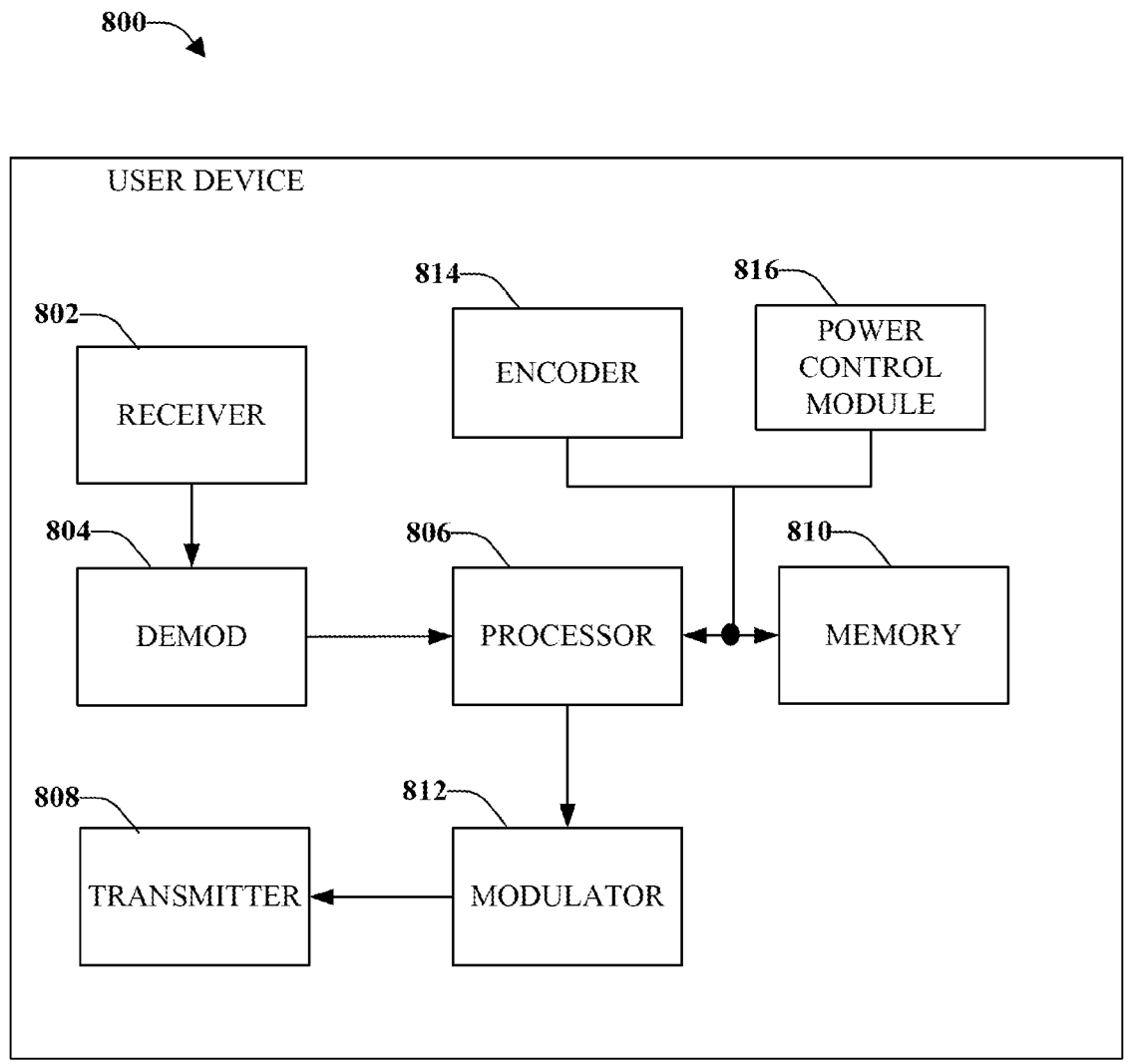
FIG. 8 illustrates a system that facilitates sending and/or receiving multiplexed unicast and broadcast information in a communication system in accordance with one or more of the disclosed aspects.

With reference now to FIG. 8, illustrated is a system 800 that facilitates sending and/or receiving multiplexed unicast and broadcast information in a communication system in accordance with one or more of the disclosed aspects. System 800 can reside in a user device or in base station. System 800 comprises a receiver 802 that can receive a signal from, for example, a receiver antenna. The receiver 802 can perform typical actions thereon, such as filtering, amplifying, down-converting, etc. the received signal. The receiver 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver 802, generate information for transmission by transmitter 808, and/or control one or more components of user device 800. Processor 806 may include a controller component capable of coordinating communications with additional user devices.

User device 800 can additionally comprise memory 808 operatively coupled to processor 806 and that can store information related to coordinating communications and any other suitable information. Memory 810 can additionally store protocols associated with signaling separate unicast and broadcast information with a common pilot, according to an aspect. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the subject systems and/or methods is intended to comprise, without being limited to, these and any other suitable types of memory. User device 800 can further comprise a symbol modulator 812. Transmitter 808 is configured to transmit the modulated signal.

User device 800 is further operatively coupled to an encoder 814 that selectively encodes unicast information as a function of whether broadcast information is to be sent at substantially the same times as the unicast information. Encoder 814 can also encode broadcast information.

Also included is a power control module 816 that can selectively include power in a unicast portion and/or a broadcast portion depending on whether a transmission request is to be sent. For example, if a null request is to be sent, no power is placed in the broadcast portion. In accordance with some aspects, power control module 816 determines a power level of a unicast portion and/or a broadcast portion in a received signal. Encoder 814 and power control module 816 can be communicatively coupled to processor 806 and/or memory 810.

Figure 9:
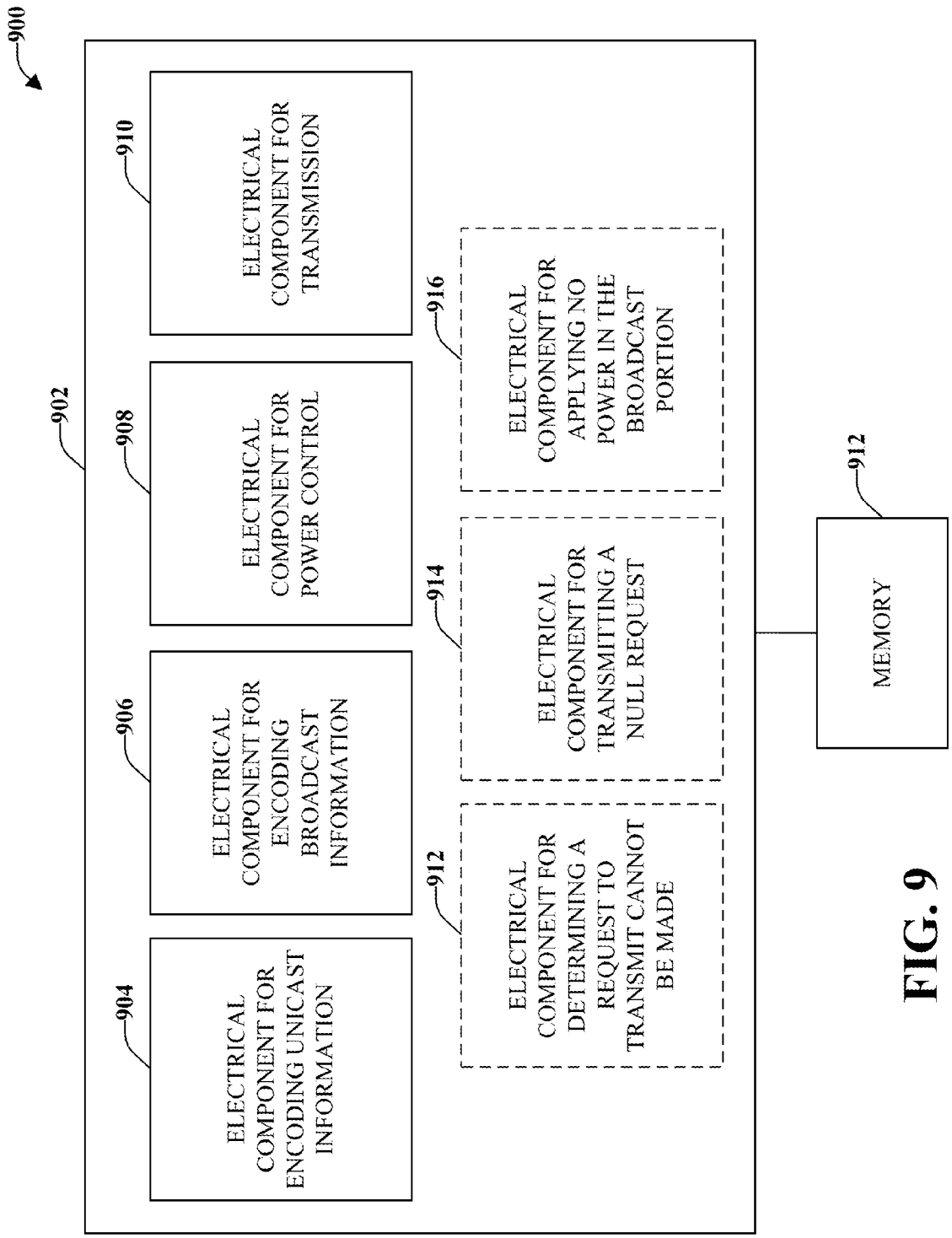
FIG. 9 illustrates an example system that multiplexes unicast and broadcast information in a communication system, according to an aspect.

With reference to FIG. 9, illustrated is an example system 900 that multiplexes unicast and broadcast information in a communication system. For example, system 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. For instance, logical grouping 902 includes an electrical component 904 for encoding unicast information in one or more resources. The unicast information is encoded as a function of whether broadcast information is being sent at substantially the same time as the unicast information.

Logical grouping 902 also includes an electrical component 906 for encoding broadcast information in one or more resources, which can be a subset of the resources for the unicast information. The broadcast information can be encoded if the broadcast information is being sent with the unicast information.

Logical grouping 902 also includes an electrical component 908 for selectively controlling the power for the unicast information and the broadcast information. The power for the unicast information and the power for the broadcast information are controlled separately. Selectively controlling the power for the unicast information and the broadcast information comprises maintaining power for the broadcast information to assist the one or more receiving device to determine interference. Further, logical grouping 902 includes an electrical component 910 for transmitting unicast information and broadcast information to one or more receiving devices.

In accordance with some aspects, logical grouping 902 includes an electrical component 912 for determining that the request is cannot be sent and an electrical component 914 for transmitting a null request on the unicast portion. Also included in logical grouping 902 can be an electrical component 916 for applying no power in the broadcast information portion.

Additionally, system 900 can include a memory 912 that retains instructions for executing functions associated with electrical components 904, 906, 908, and 910 or other components. While shown as being external to memory 912, it is to be understood that one or more of electrical components 904, 906, 908, and 910 may exist within memory 912.

Figure 10:
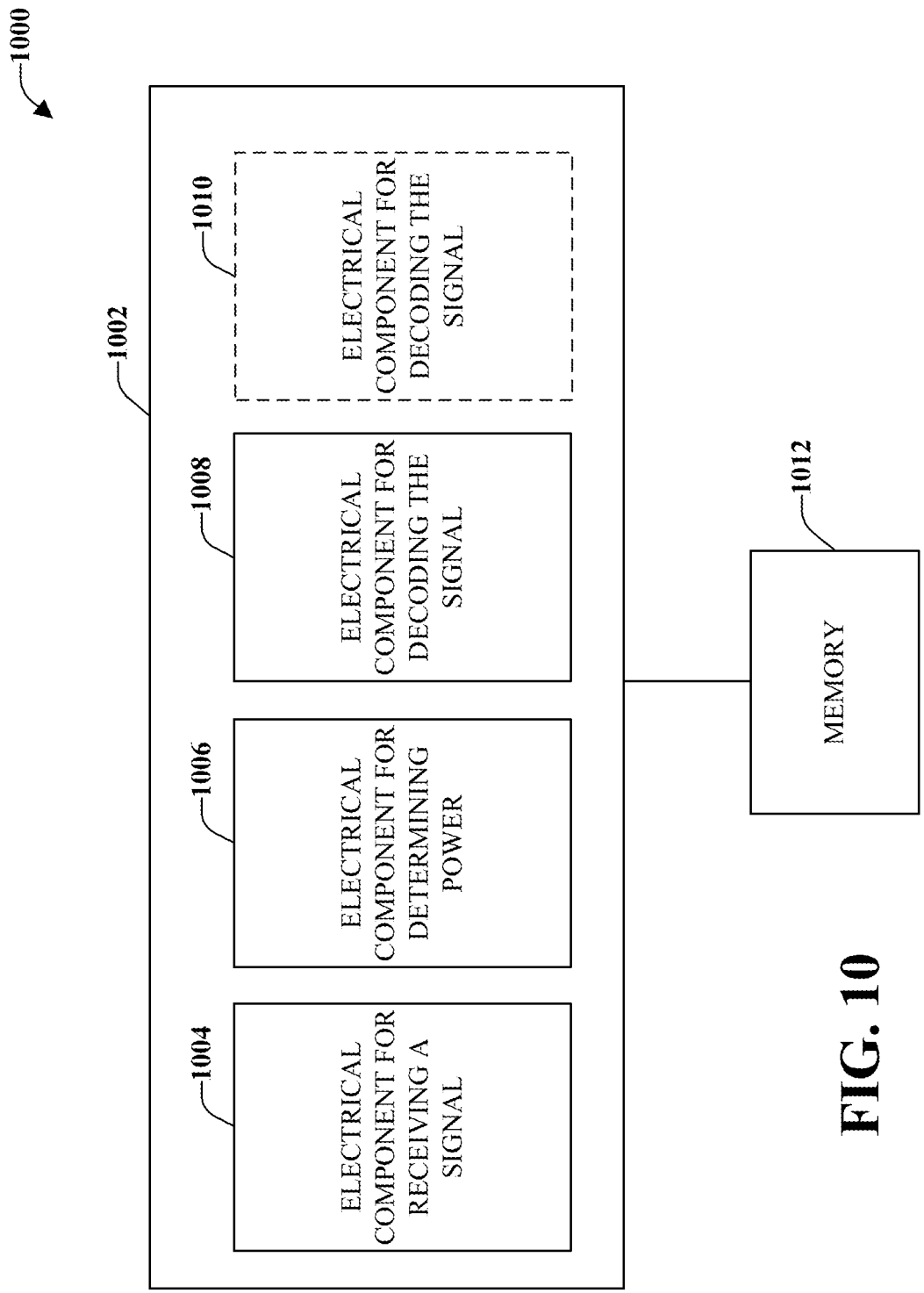
FIG. 10 illustrates an example system that receives multiplexed unicast and broadcast information in a communication system, according to an aspect.

FIG. 10 illustrates an example system 1000 that receives multiplexed unicast and broadcast information in a communication system. System 1000 may reside at least partially within a mobile device. System 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component 1004 for receiving a signal. The received signal can include a unicast portion and/or a broadcast portion.

Logical grouping 1002 can also include an electrical component 1006 for determining if the signal includes power in a unicast portion or in both the unicast portion and a broadcast portion. Further, logical grouping 1002 can include an electrical component 1008 for selectively decoding the signal based on the power determination. No power in the broadcast portion indicates a null request. The null request can indicate that a request to send data cannot be sent. In accordance with an aspect, the null request is utilized when no bits are sent at all in either the unicast or broadcast portions to signify that the transmitter does not need to send any data.

In accordance with some aspects, logical grouping 1002 includes an electrical component 1010 for combining a power level of the broadcast information and decoded bits of the unicast portion to detect a transmission request.

Additionally, system 1000 can include a memory 1012 that retains instructions for executing functions associated with electrical components 1004, 1006, 1008, and 1010, or other components. While shown as being external to memory 1012, it is to be understood that one or more of electrical components 1004, 1006, 1008, and 1010 may exist within memory 1012.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method performed by a transmitter device for multiplexing unicast and broadcast information in a communication system, comprising:
    encoding unicast information including data in one or more resources, wherein the one or more resources are configurable to be utilized solely for the unicast information;
    encoding broadcast information including data in a subset of the one or more resources when sending the broadcast information with the unicast information, wherein resources in the subset are a subset of the resources of the unicast information and are set aside for the broadcast information; and
    transmitting the unicast information and the broadcast information to one or more receiving devices as a request to transmit.

2. The method of claim 1, wherein the unicast information is encoded as a function of whether broadcast information is being sent at substantially the same time as the unicast information.

3. The method of claim 1, further comprising:
    determining that the request to transmit cannot be made;
    transmitting a null request on the unicast portion; and
    applying no power in the broadcast information portion.

4. The method of claim 1, comprises separately controlling power for the unicast information and power for the broadcast information.

5. The method of claim 4, wherein controlling the power for the unicast information and the broadcast information comprises maintaining power for at least one portion of the broadcast information to assist the one or more receiving devices to determine interference.

6. The method of claim 4, wherein controlling the power for the unicast information and the broadcast information further comprising:
    selecting the unicast portion power based on closing a link to a target receiver; and
    selecting the broadcast portion power based on indication of a level of interference.

7. The method of claim 1, wherein the one or more resources are contiguous resources selected from a resource set of a shared time-frequency grid.

8. The method of claim 7, wherein the one or more resources include a first bit for unicast information and at least a second bit for broadcast and unicast information.

9. The method of claim 8, wherein the first bit for unicast information is a buffer level indication and the at least a second bit for broadcast and unicast information indicates a priority level.

10. The method of claim 1, wherein the one or more resources comprise pilot bits, priority metric bits, and optional parity check bits, the method further comprising:
    providing power on the pilot bits for interference level indication at a target receiver; and
    power controlling a power level on the priority metric bits and the optional parity check bits based on reaching unintended receivers, wherein the transmitter device is a dominant interferer.

11. A wireless communications apparatus, comprising:
a memory that retains instructions related to encoding unicast information including data in a first resource, encoding broadcast information including data in at least a second resource when sending the broadcast information with the unicast information, wherein the second resource is configurable to be utilized solely for the unicast information, and wherein the second resource is a subset of the first resource are set aside for the broadcast information when sending broadcast information with unicast information, and transmitting the first resource and the second resource to one or more receiving devices as a request to transmit; and
a processor, coupled to the memory, configured to execute the instructions retained in the memory.

12. The wireless communications apparatus of claim 11, the memory retains further instructions related to controlling a power level for the unicast information and a power level for the broadcast information separately.

13. The wireless communications apparatus of claim 12, the memory retains further instructions related to maintaining power for the broadcast information to assist the one or more receiving devices to determine interference.

14. The wireless communications apparatus of claim 11, the memory further retains instructions related to determining that the request to transmit cannot be made, transmitting a null request on the unicast portion, and applying no power in the broadcast information portion.

15. The wireless communications apparatus of claim 14, wherein the null request is boosted in power to improve reliability of energy detection.

16. The wireless communications apparatus of claim 11, the memory further retains instructions related to selecting the unicast portion power based on closing a link to a target receiver and selecting the broadcast portion power based on indicating a level of interference.

17. The wireless communications apparatus of claim 11, wherein the first resource for unicast information includes a buffer level indication and the at least a second resource for broadcast and unicast information indicates a priority level.

18. An apparatus, comprising:
means for encoding unicast information including data in one or more resources, wherein the one or more resources are configurable to be utilized solely for the unicast information;
means for encoding broadcast information including data in a subset of the one or more resources when sending the broadcast information with the unicast information, wherein resources in the subset are a subset of the resources of the unicast information and are set aside for the broadcast information; and
means for transmitting the unicast information and the broadcast information to one or more receiving devices as a request to transmit.

19. The apparatus of claim 18, wherein the unicast information is encoded as a function of whether broadcast information is sent at substantially the same time as the unicast information.

20. The apparatus of claim 18, further comprising means for separately controlling power for the unicast information and power for the broadcast information.

21. The apparatus of claim 20, wherein the means for separately controlling power maintains power for the broadcast information to assist the one or more receiving devices to determine interference.

22. The apparatus of claim 20, further comprising:
means for determining that the request to transmit cannot be made;
means for transmitting a null request on the unicast portion; and
means for applying no power in the broadcast information portion.

23. The apparatus of claim 20, wherein the means for separately controlling power for the unicast information and the broadcast information selects the unicast portion power based on closing a link to a target receiver and selects the broadcast portion power based on indicating a level of interference.

24. The apparatus of claim 18, wherein the one or more resources are contiguous resources selected from a resource set of a shared time-frequency grid.

25. The apparatus of claim 24, wherein the one or more resources include a first bit for unicast information and at least a second bit for broadcast and unicast information.

26. A computer program product, comprising:
a non-transitory computer-readable medium comprising:
a first set of codes for causing a computer to encode unicast information including data in one or more resources, wherein the one or more resources are configurable to be utilized solely for the unicast information;
a second set of codes for causing the computer to encode broadcast information including data in the one or more resources when sending the broadcast information with the unicast information, wherein the unicast information is encoded as a function of whether the broadcast information is being sent with the unicast information; and
a third set of codes for causing the computer to transmit a request to transmit that includes the unicast information and the broadcast information to one or more receiving devices.

27. The computer program product of claim 26, the non-transitory computer-readable medium further comprising:
a fourth set of codes for causing the computer to determine information cannot be transmitted;
a fifth set of codes for causing the computer to transmit a null request on the unicast portion, wherein the null request indicates that information is available but cannot be sent; and
a sixth set of codes for causing the computer to apply no power in the broadcast information portion.

28. At least one processor configured to multiplex unicast and broadcast information in a communication system, comprising:
a first encoder module for encoding unicast information including data in one or more resources;
a second encoder module for encoding broadcast information including data in a subset of the one or more resources when sending the broadcast information with the unicast information, wherein the unicast information is encoded as a function of whether broadcast information is being sent at substantially the same time as the unicast information; and
a transmitter module for transmitting the unicast information and the broadcast information to one or more receiving devices as a request.

29. The at least one processor of claim 28, further comprising:
- a determining module for determining that data cannot be sent on the one or more resources;
- a null request transmit module for transmitting a null request on the unicast portion wherein the null request indicates that data is available but cannot be sent; and
- a power control module for applying no power in the broadcast information portion.

* * * * *